(12) United States Patent
Hirota et al.

(10) Patent No.: US 7,728,922 B2
(45) Date of Patent: Jun. 1, 2010

(54) LIQUID CRYSTAL DISPLAY DEVICE

(75) Inventors: Shoichi Hirota, Hitachi (JP); Tatsuya Sugita, Takahagi (JP)

(73) Assignee: Hitachi Displays, Ltd., Mobara-shi (JP)

( * ) Notice: Subject to any disclaimer, the term of this patent is extended or adjusted under 35 U.S.C. 154(b) by 103 days.

(21) Appl. No.: 12/114,004

(22) Filed: May 2, 2008

(65) Prior Publication Data

US 2008/0273142 A1    Nov. 6, 2008

(30) Foreign Application Priority Data

May 2, 2007   (JP)  ............................. 2007-121522

(51) Int. Cl.
    *G02F 1/1335*    (2006.01)
(52) U.S. Cl. ..................... 349/62; 349/38; 349/118; 359/260
(58) Field of Classification Search ................ 359/260, 359/290, 291, 292, 263, 242; 349/38, 62, 349/109, 192, 54–55, 115, 117, 118, 114, 349/39; 345/8, 85
    See application file for complete search history.

(56) References Cited

U.S. PATENT DOCUMENTS

| 7,349,139 | B2 * | 3/2008 | Chui et al. | 359/242 |
| 7,355,780 | B2 * | 4/2008 | Chui et al. | 359/290 |
| 7,583,354 | B2 * | 9/2009 | Tsubata et al. | 349/192 |
| 2003/0142041 | A1 * | 7/2003 | Barlow et al. | 345/8 |
| 2005/0052593 | A1 * | 3/2005 | Ting et al. | 349/109 |
| 2006/0077510 | A1 * | 4/2006 | Chui et al. | 359/260 |
| 2006/0209384 | A1 * | 9/2006 | Chui et al. | 359/290 |
| 2008/0273151 | A1 * | 11/2008 | Kuo et al. | 349/115 |
| 2008/0291375 | A1 * | 11/2008 | Asao | 349/106 |
| 2009/0066867 | A1 * | 3/2009 | Tsubata et al. | 349/38 |
| 2009/0122243 | A1 * | 5/2009 | Sugiyama et al. | 349/118 |
| 2009/0153758 | A1 * | 6/2009 | Tsubata et al. | 349/38 |
| 2009/0180196 | A1 * | 7/2009 | Li et al. | 359/641 |

FOREIGN PATENT DOCUMENTS

| JP | 09-258207 | 10/1997 |
| JP | 10-197859 | 7/1998 |
| JP | 11-121755 | 4/1999 |
| JP | 2004-294699 | 10/2004 |

* cited by examiner

*Primary Examiner*—Akm E Ullah
(74) *Attorney, Agent, or Firm*—Antonelli, Terry, Stout & Kraus, LLP.

(57) ABSTRACT

The present invention provides a liquid crystal display device in which increase in manufacturing costs is minimized and the utilization rate of illumination light emitted by a backlight source is also improved.

A pixel electrode is formed at the intersection of each signal line and each gate line on the liquid-crystal-layer side of a first transparent substrate. A color filter is provided for each pixel electrode on the liquid-crystal-layer side of a second transparent substrate. A dichroic half mirror is provided for each of the color filters.

8 Claims, 6 Drawing Sheets

LIQUID CRYSTAL DISPLAY DEVICE

BACKGROUND OF THE INVENTION

1. Field of the Invention

The present invention relates to a liquid crystal display device capable of displaying an image with an improved utilization rate of light emitted from a backlight source.

2. Description of the Related Art

For liquid crystal display devices, a mainstream method for displaying a color image is to arrange, side by side, sub-pixels provided for respective color filters of three primary colors of red (R), green (G), and blue (B) and arbitrarily adjust brightness of each of the sub-pixels in order to generate a color by additive color mixing. While this method is capable of a vivid color display, color filters absorb light having a wavelength range other than that of light passing through the color filters, resulting in a loss of the light. Thus, a sufficient quantity of the light may not be ensured, and the light utilization efficiency is low.

As a solution to the above problem, JP-A-2004-294699 discloses a display device including filters (a dichroic filter, a dichroic mirror, a pigment filter causing a bronzing effect, etc.) each having a property to reflect light having a wavelength within a visible range among illumination light emitted by a backlight source, except particular color light to be transmitted through the corresponding filter. Each filter of the above is capable of minimizing a reduction in light intensity, compared with a color filter causing a reduction in the intensity of light having colors other than a predetermined color or colors. This results from the fact that the light reflected by the former color filter is returned to the backlight source, reflected by the backlight source, re-directed to the pixel, and reused. This technique makes it possible, in a liquid crystal display device, to increase the utilization rate of the illumination light emitted by the backlight source.

SUMMARY OF THE INVENTION

Each of general dichroic filters and dichroic mirrors is composed of a multilayer film with several tens of dielectric layers. Thus, the cost of manufacturing such dichroic filters or dichroic mirrors is high, and it has been difficult to put them into practical use. It is, therefore, an object of the present invention to provide a liquid crystal display device in which increase in manufacturing costs is minimized and the utilization rate of illumination light emitted by a backlight source provided in the liquid crystal display device is improved.

The liquid crystal display device according to the present invention includes a first transparent substrate (active matrix substrate), a second transparent substrate (color filter substrate), a liquid crystal layer formed between the first and second transparent substrates, and a backlight source. In the liquid crystal display device, a dichroic half mirror is formed between the active matrix substrate and the color filter substrate and provided for a color filter. The dichroic half mirror has layers the number of which is reduced compared with that of layers included in a general dichroic mirror.

The liquid crystal display device according to the present invention is provided with the dichroic half mirror in which increase in manufacturing costs can be minimized and the utilization rate of the illumination light emitted by the backlight source can also be improved.

BRIEF DESCRIPTION OF THE DRAWINGS

Other objects and advantages of the invention will become apparent from the following description of embodiments with reference to the accompanying drawings in which:

FIGS. 6A to 6G are diagrams explaining a method for forming the dichroic half mirror 110;

BEST MODE FOR CARRYING OUT THE INVENTION

Embodiments of the present invention will be described with reference to the accompanying drawings.

FIRST EMBODIMENT

Figure 1:
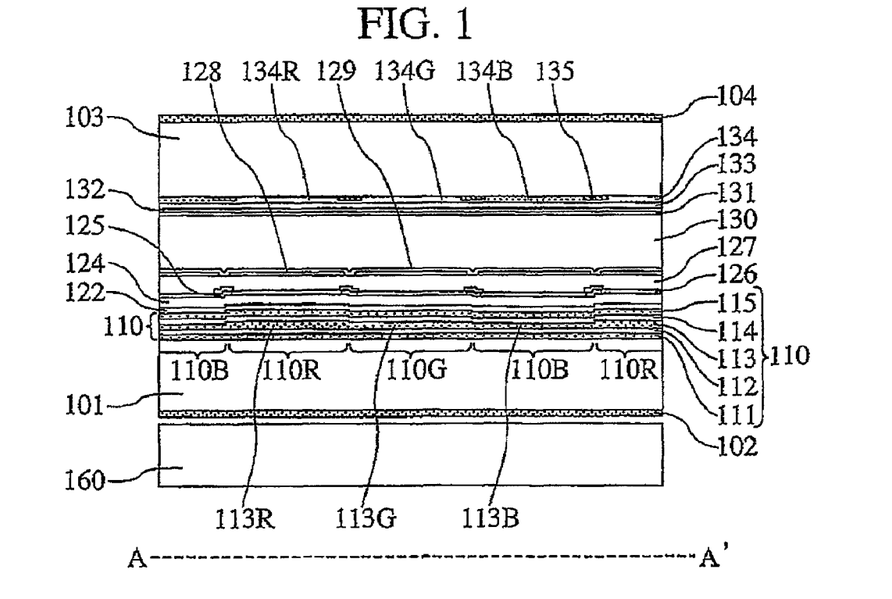
FIG. 1 is a cross-sectional view of a liquid crystal display device according to the present invention, taken along line A-A' of FIG. 2.
Figure 2:
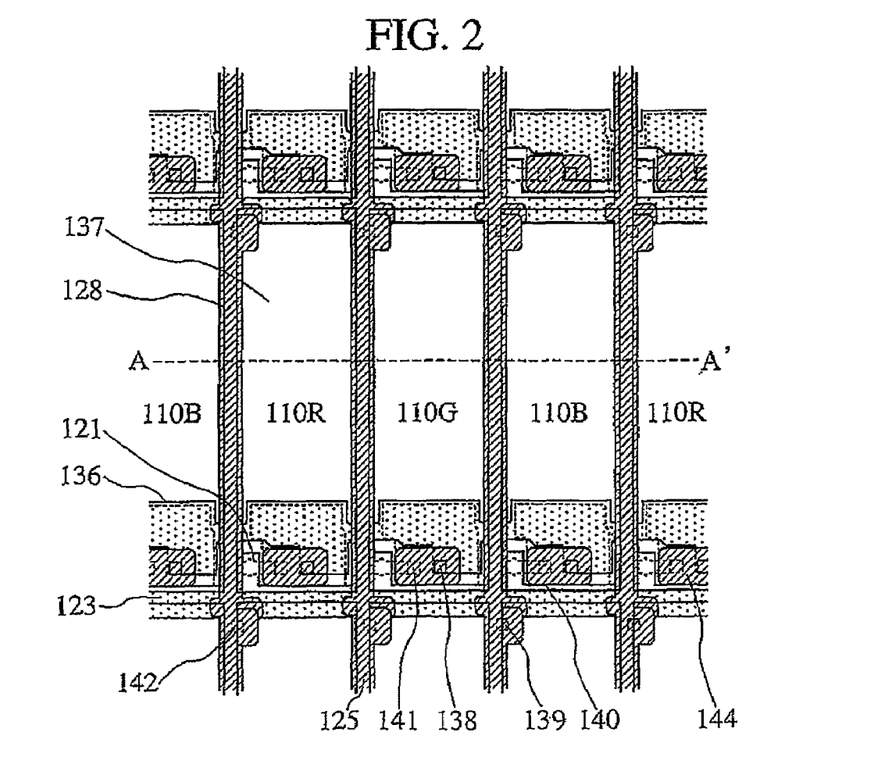
FIG. 2 is a plan view of the liquid crystal display device according to the present invention.
Figure 3:
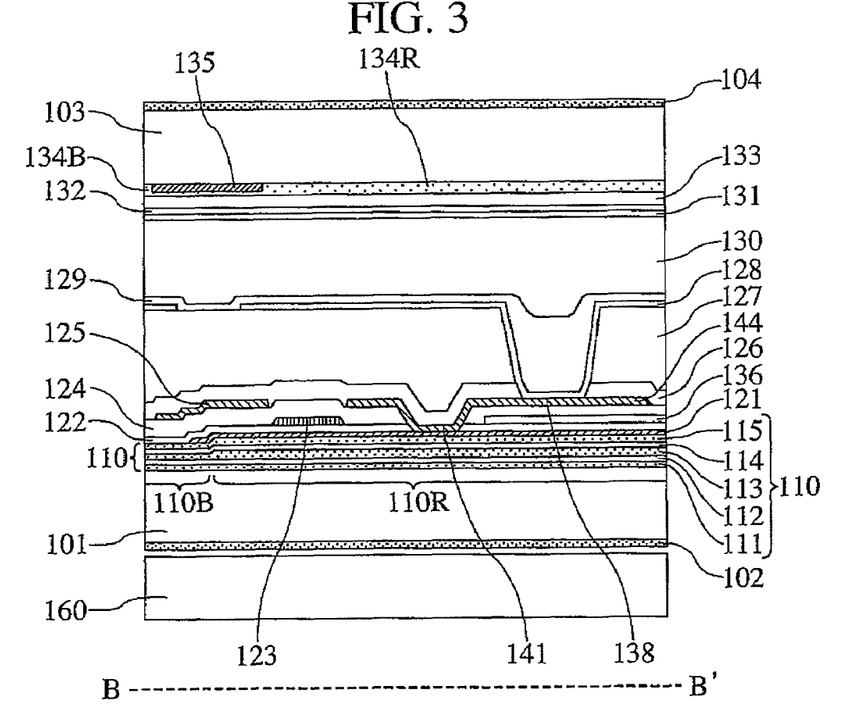
FIG. 3 is a cross-sectional view of the liquid crystal display device according to the present invention, taken along line B-B' of FIG. 2.

First, a description will be made of a first embodiment of the present invention with reference to FIGS. 1 to 3. FIGS. 1 and 3 are cross-sectional views of a liquid crystal display device according to the first embodiment, taken along lines A-A' and B-B' of FIG. 2, respectively. FIG. 2 is a plan view of the liquid crystal display device according to the first embodiment.

FIG. 2 shows only an active matrix substrate including an active matrix formed on a first transparent substrate 101 shown in FIG. 1. Omitted from FIG. 2 are a color filter substrate which includes a color filter 134 formed on a second transparent substrate 103 shown in FIG. 1; a liquid crystal layer 130; and a backlight source 160. FIG. 2 shows part of a matrix array of sub-pixels of red (R), green (G) and blue (B).

The liquid crystal display device according to the present embodiment is provided with the backlight source 160, the first transparent substrate 101, the second transparent substrate 103, and the liquid crystal layer 130 formed between the first and second transparent substrates 101 and 103 as shown in FIG. 1. An optical film 102 such as a polarization plate is attached to the first transparent substrate 101 on the side of the backlight source 160.

A dichroic half mirror 110 is formed on the first transparent substrate 101 on the side of the liquid crystal layer 130 and has high-refractive-index layers 111, 113 and 115 and low-refractive-index layers 112 and 114, which are alternately laminated (in the order from the layer 111, 112, 113, 114 to 115). As shown in FIG. 3, the following are also formed above the first transparent substrate 101: a polysilicon layer 121; a gate insulating film 122; a gate line 123 serving also as a gate electrode; a common wiring 136 formed in the same layer that of as the gate line 123; a signal line 125; a source electrode 144 formed in the same layer as that of the signal line 125; an interlayer insulating film 124 for electrically separating the gate line 123 and the signal line 125 from the common wiring 136 and the source electrode 144, respectively; a pixel electrode 128; interlayer insulating films 126 and 127 for electrically separating the gate line 123 from the pixel electrode 128; and an orientation film 129 for orienting the liquid crystal layer 130.

Each of the sub-pixels has first and second transistors 139 and 140 for transferring an image signal voltage from the signal line 125 to the pixel electrode 128 as shown in FIG. 2. The signal line 125 and the polysilicon layer 121 are electrically connected with each other through a contact 142. The polysilicon layer 121 and the source electrode 144 are electrically connected with each other through a contact 141. The source electrode 144 and the pixel electrode 128 are electrically connected with each other through a contact 138.

More specifically, the signal line 125 is connected with a drain electrode of the first transistor 139; a source electrode of the first transistor 139 and a drain electrode of the second transistor 140 are connected with each other; and a source electrode of the second transistor 140 is connected with the pixel electrode 128. In addition, a gate electrode of the first transistor 139 and a gate electrode of the second transistor 140 are connected with the gate line 123.

An optical film 104, such as a polarization plate, is attached to the second transparent substrate 103 shown in FIG. 1 on the opposite side of the liquid crystal layer 130. The following are formed on the liquid-crystal-layer-130 side of the second transparent substrate 103: a light blocking layer 135; the color filter 134; a protective layer 133; a common electrode 132; an orientation film 131 for orienting the liquid crystal layer 130; and the like.

Illumination light emitted by the backlight source 160 passes through a portion of each of the sub-pixels. The portion of each of the sub-pixels is an area in which an aperture 137 of the active matrix substrate (shown in FIG. 2) and an aperture of the color filter substrate (not shown in FIG. 2) are overlapped with each other. During that period of the light passage, the liquid crystal layer 130 is controlled by a voltage applied to the pixel electrode 128 to modulate a phase of the illumination light. The modulation of the phase of the illumination light causes the quantity of light passing through the optical film 104 (such as a polarization plate) to be modulated, whereby display brightness can be adjusted. The brightnesses of the respective pixels are independently controlled by controlling the timing of turning on and off the transistor of each pixel and controlling an image signal voltage transferred through the signal line 125 to ensure that an image is displayed.

The dichroic half mirror 110 according to the present embodiment is formed between the first transparent substrate 101 and a layer including the first and second transistors 139 and 140 and the pixel electrode 128, which layer is formed above the polysilicon layer 121. The dichroic half mirror 110 has high-refractive-index layers 111, 113 and 115 and low-refractive-index layers 112 and 114, in which the high-refractive-index layers and the low-refractive-index layers are alternately laminated. Each of the high-refractive-index layers 111, 113 and 115 is made of a material having a high refractive index; each of the low-refractive-index layers 112 and 114 is made of a material having a low refractive index. In the present embodiment, a silicon nitride film is used as the material with a high refractive index, and a silicon oxide film is used as the material with a low refractive index.

The materials for the dichroic half mirror 110 are not limited to the silicon nitride film and the silicon oxide film. Either of the silicon nitride film or the silicon oxide film or both can be replaced with another/other material/materials provided that two materials to be used are both transparent and have a refractive index difference between the two that is as large as that between the silicon nitride film and the silicon oxide film.

In the present embodiment, the silicon nitride film and the silicon oxide film are used for the reason that an additional investment in facilities is not necessary because the films are used in the existing liquid crystal display devices. Among the layers constituting the layer of the dichroic half mirror 110, only the middle high-refractive-index layer 113 has portions with mutually-different thicknesses based on associated sub-pixel colors. Each of the high-refractive-index layers 111 and 115 and the low-refractive-index layers 112 and 114 has a thickness which does not vary based on sub-pixel colors. The thickness of each layer included in the dichroic half mirror 110 is measured in a direction perpendicular to the surface of the first transparent substrate 101.

The high-refractive-index layer 113 has portions provided for the respective sub-pixels of red, green, and blue. The portions for the red, green, and blue sub-pixels are expressed by a high-refractive-index layer 113R, a high-refractive-index layer 113G, and a high-refractive-index layer 113B, respectively. The thickness of the high-refractive-index layer 113G is smaller than that of the high-refractive-index layer 113R and larger than that of the high-refractive-index layer 113B. As described above, the thickness of the high-refractive-index layer 113 is adjusted based on associated sub-pixel colors to ensure that a peak wavelength of light passing through the dichroic half mirror 110 is consistent with spectral characteristics of the color filter for the corresponding sub-pixel. Only the high-refractive-index layer 113 has the portions with mutually-different thicknesses based on the sub-pixel colors among the layers included in the dichroic half mirrors 110. This makes it possible to minimize a cost increase in forming the dichroic half mirror 110.

In the present embodiment, the thickness of each of the high-refractive-index layers 111 and 115 included in the dichroic half mirror 110 is 60 nm. The thickness of each of the low-refractive-index layers 112 and 114 included in the dichroic half mirror 110 is 80 nm. The high-refractive-index layers 113R, 113G, and 113B have a thickness of 180 nm, 140 nm, and 110 nm, respectively.

Figure 4:
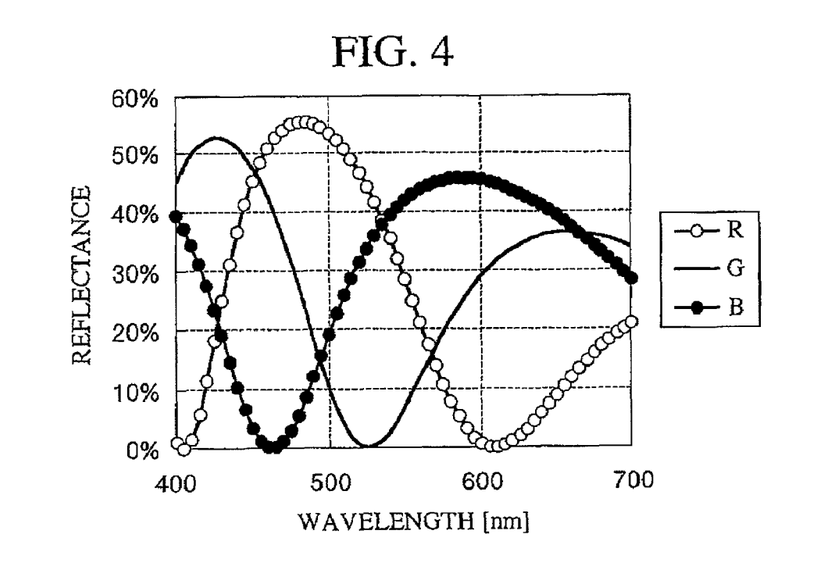
FIG. 4 is a graph showing spectral characteristics of a dichroic half mirror 110.

FIG. 4 is a graph showing spectral characteristics (reflectance) of the dichroic half mirror 110 according to the present embodiment. In FIG. 4, the terms of "R," "G," and "B" indicate spectral characteristics (reflectance) of dichroic half mirrors 110R, 110G and 110B provided for the sub-pixels of red, green, and blue, respectively.

As an example, the spectral characteristics (reflectance) of the dichroic half mirror 110G will be described. The dichroic half mirror 110G has a reflectance of approximately 50% for light having a wavelength of approximately 460 nm, which corresponds to a wavelength range of blue light. It also has a reflectance of approximately 35% for light having a wavelength of approximately 610 nm, which corresponds to a wavelength range of red light. In addition, it has a reflectance of approximately 0% and transmittance of approximately 100% for light having a wavelength of approximately 530 nm, which corresponds to a wavelength range of green light. On the other hand, the dichroic half mirror 110B has a reflectance of approximately 0% (and transmittance of approximately 100%) for light having a wavelength of approximately 460 nm; the dichroic half mirror 110R has a reflectance of approximately 0% (and transmittance of approximately 100%) for light having a wavelength of approximately 610 nm.

The design of the above-mentioned thicknesses and spectral characteristics (reflectance) of the dichroic half mirror 110 is only meant to be an example. It should be noted that the thickness of each layer included in the dichroic half mirror 110 needs to be finely adjusted based on the refractive index of the material to be used and on the wavelength of the transmitted light, which satisfies desired chromatic characteristics.

Figure 5:
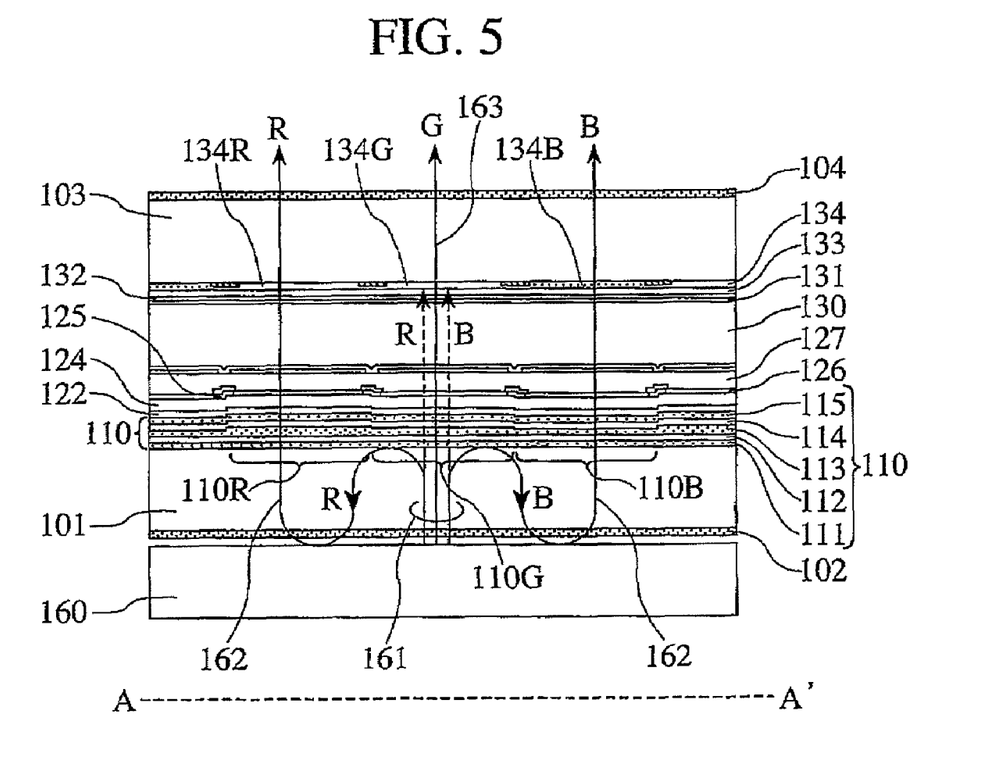
FIG. 5 is a diagram explaining a function of the dichroic half mirror 110.

A description will be made of a function of the dichroic half mirror 110 according to the present embodiment with reference to FIG. 5. The backlight source 160 emits white light 161. Some components of the white light 161 are incident on the dichroic half mirror 110G. The components of the white light 161 incident on the dichroic half mirror 110G includes red, green and blue light components. Some of the red and blue light components are reflected by the dichroic half mirror 110G back to the backlight source 160 and then reflected by the backlight source 160. As a result, the reflected red and blue light components, retro-reflected light 162, serve again as illumination light.

For example, some of the red light components of the retro-reflected light 162 are incident again on the red sub-pixel and effectively act to display an image. Transmitted light 163 through the dichroic half mirror 110G includes green light components and also red and blue light components which has not been reflected by the dichroic half mirror 110G. These red and blue light components, however, are absorbed by a color filter 134G which is provided for the green sub-pixel. Among the transmitted light 163 through the dichroic half mirror 110G, the green light components passing through the green sub-pixel effectively act to display an image.

Next, an explanation will be given for the reason that, in this embodiment, the dichroic half mirror 110 is formed between the first transparent substrate 101 and the liquid crystal layer 130. In order to reuse light reflected by the dichroic half mirror 110, it is necessary that the light that is reflected back to the backlight source 160 and then directed toward the mirror 110 again be incident on a sub-pixel of a color different from that of the sub-pixel from which the light was reflected. When the distance between the dichroic half mirror 110 and the backlight source 160 is small, there is a high possibility that light reflected by the dichroic half mirror 110 at a sub-pixel of a certain color is returned to the same sub-pixel.

In order to increase a possibility that light reflected by the dichroic half mirror 110 at a sub-pixel of a certain color is directed toward a sub-pixel of a different color, it is therefore preferable to ensure a sufficient distance between the dichroic half mirror 110 and the backlight source 160. Accordingly, in the present embodiment, the first transparent substrate 101 is provided between the dichroic half mirror 110 and the backlight source 160, which substrate typically has a thickness of 0.2 mm to 0.4 mm, measured in the same direction as that of each layer included in the dichroic half mirror 110. Because a short side of a typical sub-pixel is 25 μm to 50 μm in length, an aspect ratio of approximately 10:1 is ensured between the short-side length of the sub-pixel and the thickness of the mirror 110.

It is desirable that the transmitted light 163 through the dichroic half mirror 110 reach a corresponding color filter 134 (134R, 134G, or 134B) from a perspective of light efficiency. To achieve this, the distance between the dichroic half mirror 110 and the color filter 134 is desirably reduced to a possible minimum distance.

In the present embodiment, the dichroic half mirror 110 is formed between the first transparent substrate 101 and the color filter 134 to sufficiently reduce the distance between the dichroic half mirror 110 and the color filter 134, thereby allowing almost all components of the transmitted light 163 through the dichroic half mirror 110 to reach corresponding color filters 134 (134R, 134G, or 134B). More specifically, the dichroic half mirror 110 and the color filter 134 are separated typically by a distance of 5 μm to 10 μm, which is sufficiently smaller than the short-side length (25 μm to 50 μm) of a typical sub-pixel.

In addition, it is expected that the light reflected by the dichroic half mirror 110 efficiently passes through the optical film 102 such as a polarization plate. If the dichroic half mirror 110 is formed between the liquid crystal layer 130 and the second transparent substrate 103, the phase of the light reflected by the dichroic half mirror 110 is affected by the liquid crystal layer 130. The effect of the liquid crystal layer 130 on the phase of the light varies depending on voltages applied to the pixel electrode 128. This means that effects of improving light utilization efficiency by use of the dichroic half mirror 110 depend on the image to be displayed. Thus, it is not desirable that the dichroic half mirror 110 is formed between the liquid crystal layer 130 and the second transparent substrate 103. Accordingly, the dichroic half mirror 110 is formed between the liquid crystal layer 130 and the first transparent substrate 101 to avoid the above-mentioned problem.

Consideration should also be given to an effective retardation of the optical film 102. For example, when the optical film 102 (such as a polarizer) is used in which its polarizing plate and its quarter-wavelength plate are arranged such that their optical axes form 45 or 135 degrees (an optical film of this type is called an circularly polarizing plate), the light reflected by the dichroic half mirror 110 is absorbed by the polarizing plate. This makes it impossible to reuse the light reflected by the dichroic half mirror 110. It is, therefore, necessary that the effective retardation of the optical film 102 be less than a quarter of the wavelength of the light incident on the optical film 102.

In the present embodiment, the dichroic half mirror 110 is formed between the first transparent substrate 101 and the layer including the first and second transistors 139 and 140 and the pixel electrode 128, which layer is formed above the polysilicon layer 121. The reason for this will be given below.

If the dichroic half mirror 110 is formed on or above the polysilicon layer 121, it is necessary that a contact hole extending through the dichroic half mirror 110 be formed to establish an electrical connection between layers sandwiching the dichroic half mirror 110.

In the present embodiment, on the contrary, the dichroic half mirror 110 is formed between the first transparent substrate 101 and the layer including the first and second transistors 139 and 140 and the pixel electrode 128, which layer is formed above the polysilicon layer 121. In this case, it is not necessary to ensure the electrical connection between the layers sandwiching the dichroic half mirror 110; thus, a process for forming the contact hole extending through the dichroic half mirror 110 is not necessary.

In addition, if the dichroic half mirror 110 is formed between the pixel electrode 128 and the liquid crystal layer 130, the contact hole extending through the dichroic half mirror 110 is not necessary. In this case, however, a voltage to be applied to the liquid crystal layer 130 is divided between the dichroic half mirror 110 and the liquid crystal layer 130, resulting in an increase in the effective voltage for driving the liquid crystal layer 130.

Also, polysilicon is used for the semiconductor layer including the transistors in the present embodiment. In this case, it is desirable that a protective film is formed between the polysilicon layer 121 and the first transparent substrate 101 to prevent ions from diffusing from a support substrate. The protective film may be a laminated film including a silicon nitride layer and a silicon oxide layer. Since, in the present embodiment, the dichroic half mirror 110 is formed between the first transparent substrate 101 and the layer including the first and second transistors 139 and 140 and the pixel electrode 128, which layer is formed above the polysilicon layer 121, the dichroic half mirror 110 functions also as the protective film to prevent ions from diffusing from the first transparent substrate 101 to the transistors.

Thus, the number of layers to be added and the number of processes involved therein can be minimized by selecting the silicon nitride film and the silicon oxide film as materials of the dichroic half mirror 110 and using a part of the dichroic half mirror 110 as the protective film for protecting the transistors.

For the above-mentioned reason, in the present embodiment, the dichroic half mirror 110 is formed between the first transparent substrate 101 and the layer including the first and second transistors 139 and 140 and the pixel electrode 128, which layer is formed above the polysilicon layer 121.

FIGS. 6A to 6G are diagrams explaining a method for forming the dichroic half mirror 110 according to the present embodiment. As shown in the final stage of FIG. 6G, thicknesses of the high-refractive-index layer 113 at the red, green, and blue sub-pixels are denoted by dR, dG, and dB, respectively.

Figure 6A:
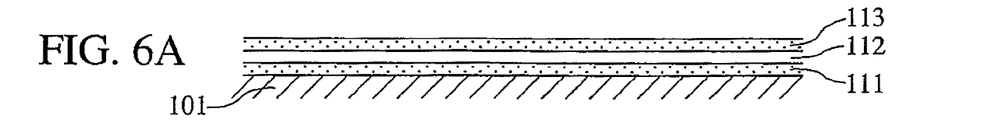
Figure 6B:
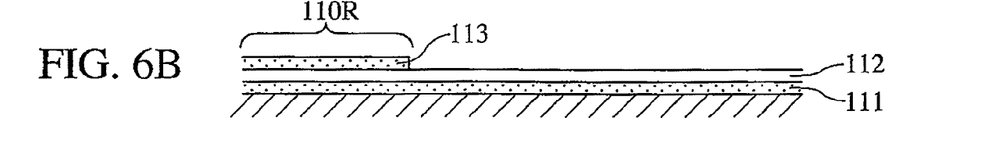
Figure 6C:
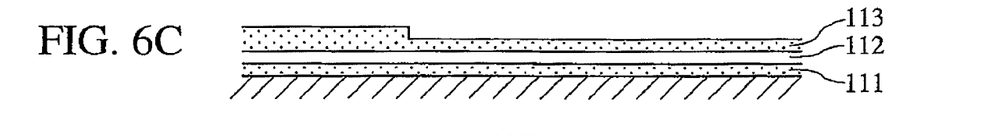
Figure 6D:
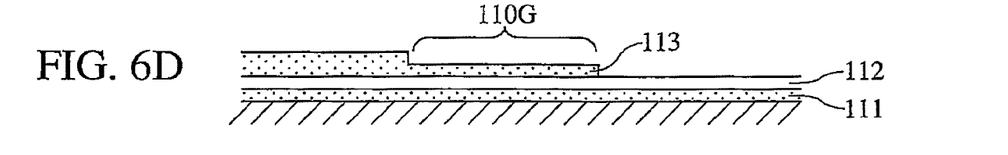
Figure 6E:
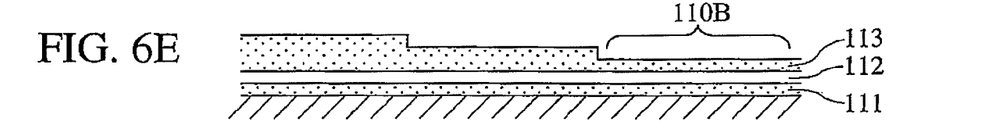

FIG. 6A shows a state in which the high-refractive-index layer 111, the low-refractive-index layer 112, and the high-refractive-index layer 113 are laminated in this order on the first transparent substrate 101. In the stage shown in FIG. 6A, the high-refractive-index layer 113 has a thickness expressed by dR−dG. In FIG. 6B, a portion of the high-refractive-index layer 113 that corresponds to the red-sub-pixel position is left intact. The remaining portion of the high-refractive-index layer 113 that corresponds to the green- and blue-sub-pixel positions is removed by a photolithography process. In FIG. 6C, another high-refractive-index layer 113 is laminated on the state shown in FIG. 6B. The portion of the high-refractive-index layer 113 which corresponds to the red-sub-pixel position as shown in FIG. 6B has a thickness larger than that of the remaining portion of the high-refractive-index layer 113. The high-refractive-index layer 113 additionally laminated has a thickness expressed by dG−dB. FIG. 6D shows a state in which the portion of the high-refractive-index layer 113 that corresponds to the blue-sub-pixel position is removed by the photolithography process. FIG. 6E shows a state in which another high-refractive-index layer 113 the thickness of which is dB is further laminated. The portion of the high-refractive-index layer 113 which corresponds to the red-sub-pixel position has the largest thickness, dR; the portion of the high-refractive-index layer 113 which corresponds to the green-sub-pixel position has the second largest thickness, dG. FIG. 6F shows a state in which the low-refractive-index layer 114 is further laminated. FIG. 6G shows a state in which the high-refractive-index layer 115 is further laminated after the state shown in FIG. 6F, also showing that the dichroic half mirror 110R, 110G and 110B are formed for the red, green, and blue sub-pixel, respectively. Thereafter, the polysilicon layer 121, the layer in which the transistors are formed, and the pixel electrode 128 are sequentially formed on the configuration of FIG. 6G, thereby completing the active matrix substrate.

FIGS. 7A to 7D are diagrams explaining another method for forming the dichroic half mirror 110 according to the present embodiment. The difference between the method shown in FIGS. 7A to 7D and the method shown in FIGS. 6A to 6G is as follows. In the method shown in FIGS. 7A to 7D, a half-tone mask is used in the photolithography process to collectively control the thicknesses of the high-refractive-index layers 113R, 113G and 113B provided for the red, green, and blue sub-pixel, respectively. In the method shown in FIGS. 6A to 6G, the high-refractive-index layer 113 is formed by three deposition processes. In the method shown in FIGS. 7A to 7D, however, the high-refractive-index layer 113 is formed by a single deposition process.

Figure 7A:
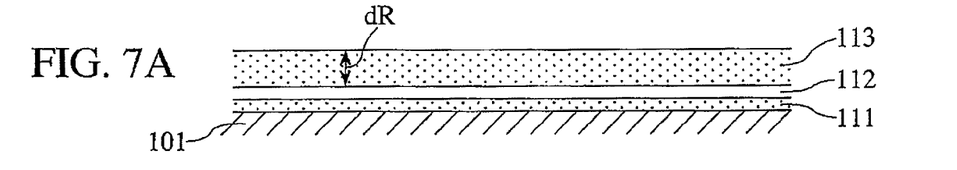
FIGS. 7A to 7D are diagrams explaining another method for forming the dichroic half mirror 110.
Figure 7B:
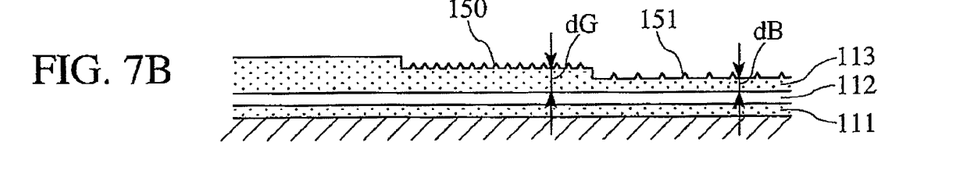
Figure 7C:
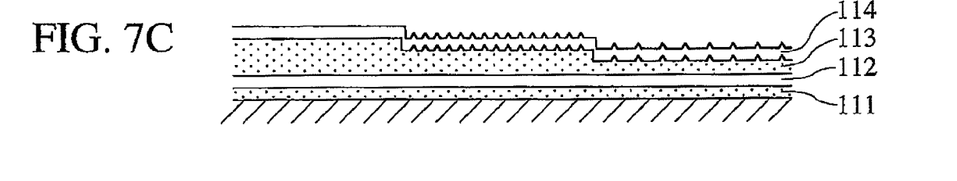
Figure 7D:
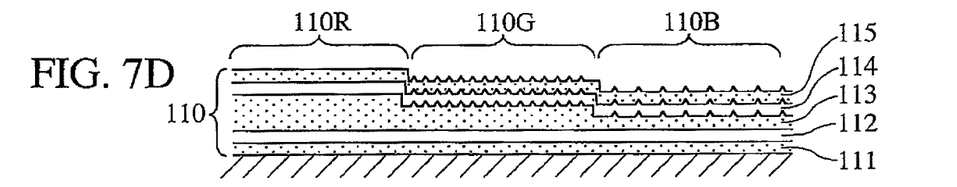

FIG. 7A shows a state in which the high-refractive-index layer 111, the low-refractive-index layer 112, and the high-refractive-index layer 113 are laminated in this order on the first transparent substrate 101. Unlike FIG. 6A, the high-refractive-index layer 113 is formed to have the thickness, dR, by a deposition process in advance, which thickness is necessary for the red sub-pixel. In FIG. 7B, the half-tone mask is used in the photolithography process to adjust the thickness of a portion of the high-refractive-index layer 113 for the green sub-pixel to the thickness dG and the thickness of a portion of the refractive index layer 113 for the blue sub-pixel to the thickness dB. In this mirror-forming method, ridge protrusions 150 and 151 of several nanometers are left by use of the half-tone mask as shown in FIG. 7B. The heights of the ridge protrusions 150 and 151 are sufficiently small relative to the values of dG and dB, measured in the same direction as the thickness of each layer included in the dichroic half mirror 110. Thus, effects of the ridge portions on the function of the dichroic half mirror 110 are negligible. The ridge protrusions 150 formed at the position corresponding to the green sub-pixel and the ridge protrusions 151 formed at the position corresponding to the blue sub-pixel differ in their pitch, with the pitch of the ridge protrusion 151 being wider. This results from the fact that aperture pitch of a half-tone mask portion used for the blue-sub-pixel side is set larger than that of a half-tone mask portion used for the green-sub-pixel side so that the portion of the high-refractive-index layer 113 that corresponds to the blue-sub-pixel position can be more etched away. FIG. 7C shows a state in which the low-refractive-index layer 114 is further laminated. FIG. 7D shows a state in which the high-refractive-index layer 115 is further laminated, also showing that the dichoric half mirrors 110R, 110G and 110B are formed for the red, green, and blue sub-pixel, respectively. Thereafter, the polysilicon layer 121, the layer in which the transistors are formed, and the pixel electrode 128 are sequentially formed on the configuration of FIG. 7D, thereby completing the active matrix substrate.

The method for forming the dichroic half mirror 110 is not limited to the above-mentioned methods. This results from the fact that the essence of the present invention lies in the configuration and the function of the dichroic half mirror 110 and does not depend on the method for forming the dichroic half mirror 110.

SECOND EMBODIMENT

A description will be made of a second embodiment of the present invention with reference to FIGS. 8 and 9. In the first embodiment, the dichroic half mirror 110 has five layers. In the second embodiment, however, the dichroic half mirror 110 has seven layers. This is the difference between the first and second embodiments.

Figure 8:
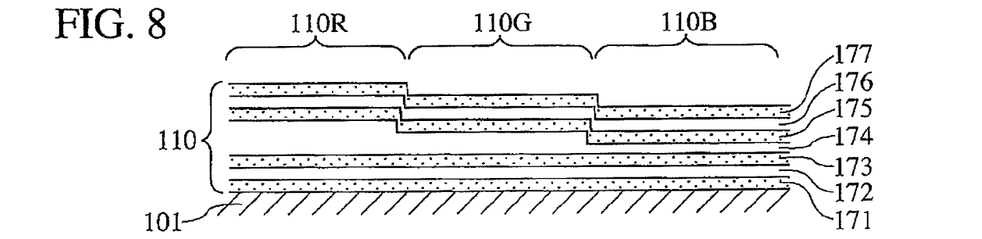
FIG. 8 is a cross sectional view of the dichroic half mirror 110 having seven layers.

FIG. 8 shows a state in which only the dichroic half mirror 110 is completed on the first transparent substrate 101, in order to clarify the difference between the first and second embodiments. In FIG. 8, the configuration of the first and second transistors 139 and 140 and the pixel electrode 128, all of which are formed above the polysilicon layer 121 formed above the dichroic half mirror 110, is the same as that in the first embodiment and therefore omitted.

The dichroic half mirror 110 according to the second embodiment has high-refractive-index layers 171, 173, 175 and 177 and low-refractive-index layers 172, 174 and 176, in which the high-refractive-index layers and the low-refractive-index layers are alternately laminated (in the order from the layer 171, 172, 173, 174, 175, 176 to 177) as shown in FIG. 8. Among those layers, only the middle high-refractive-index layer 174 has portions with mutually-different thicknesses based on the associated sub-pixel colors.

Figure 9:
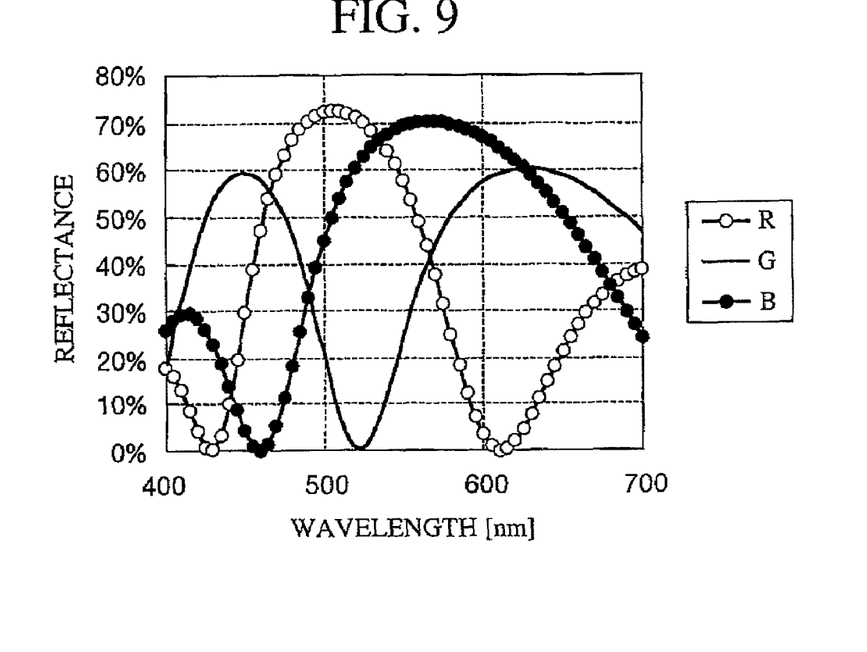
FIG. 9 is a graph showing spectral characteristics of the dichroic half mirror having the seven layers.

FIG. 9 is a graph showing spectral characteristics of the dichroic half mirror 110 according to the present embodiment. Also in the present embodiment, a silicon nitride film is used as a material with a high refractive index, and a silicon oxide film is used as a material with a low refractive index. The thickness of each of the high-refractive-index layers 171, 173, 175 and 177 is 60 nm, and the thickness of each of the low-refractive-index layers 172 and 176 is 100 nm. With regard to the middle low-refractive-index layer 174, its portion corresponding to the red-sub-pixel position has a thickness of 240 nm; its portion corresponding to the green-sub-pixel position has a thickness of 195 nm; and its portion corresponding to the blue-sub-pixel position has a thickness of 150 nm.

The design of the above-mentioned thicknesses and spectral characteristics (reflectance) of the dichroic half mirror 110 according to the second embodiment is only meant to be an example. It should be noted that the thickness of each layer needs to be finely adjusted based on the refractive index of the material to be used and on the wavelength of the transmitted light, which satisfies desired chromatic characteristics.

THIRD EMBODIMENT

A description will be made of a third embodiment with reference to FIG. 10. In the third embodiment, a sub-pixel of white is used, in addition to the sub-pixels of three primary colors (red, green, and blue). This is the difference between the first and third embodiments. A color filter 134W provided for the white sub-pixel does not include a color resist. Thus, the white sub-pixel has a higher light transmittance than those of the other sub-pixels because light traveling through the white sub-pixel is not absorbed by the color filter 134W. It is thus expected that the transmittance of the liquid crystal display device can be increased by appropriately controlling the lighting conditions of the white sub-pixel based on an image to be displayed.

Figure 10:
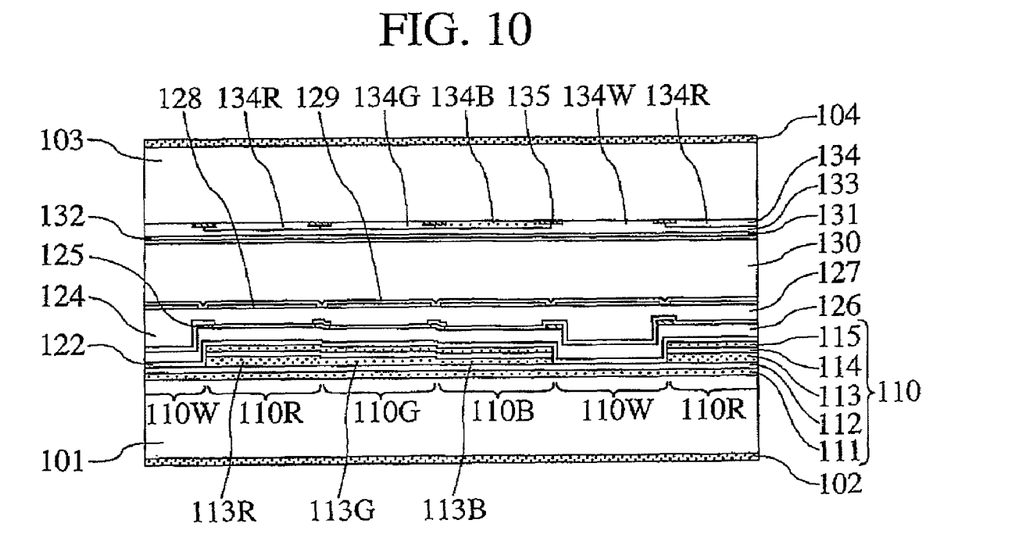
FIG. 10 is a cross sectional view of another liquid crystal display device according to the present invention.

As shown in FIG. 10, the dichroic half mirror 110W corresponding to the white sub-pixel position has only the high-refractive-index layer 111 and the low-refractive-index layer 112; the high-refractive-index layers 113 and 115 and the low-refractive-index layer 114 are removed from the dichroic half mirror 110W. This configuration is also referred to as a dichroic half mirror (110W) to maintain consistency with the configurations at the other sub-pixels. However, the dichroic half mirror 110W exhibits neutral spectral characteristics and does not reflect a particular visible light. This results from the fact that, since light traveling through the white sub-pixel is not absorbed by the color filter 134W, the dichroic half mirror 110 does not need to reflect a particular visible light to reuse the light.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid crystal display device, comprising:
a first transparent substrate;
a second transparent substrate;
a liquid crystal layer located between the first and second transparent substrates;
a backlight source located on the side of the first transparent substrate that is opposite to the liquid crystal layer;
a plurality of signal lines, a plurality of gate lines, and a plurality of sub-pixels, which are formed in matrix form on the liquid-crystal-layer side of the first transparent substrate, each of the sub-pixels including a transistor and a pixel electrode for transmitting an image signal voltage to the liquid crystal layer and being located at each intersection of the signal lines and the gate lines;
an optical film located on the backlight-source-side of the first transparent substrate;
a color filter provided for each of the sub-pixels and located on the liquid-crystal-layer side of the second transparent substrate; and
an optical film located on the side of the second transparent substrate that is opposite to the liquid crystal layer,
wherein illumination light emitted from the backlight source is phase-modulated by driving the liquid crystal layer, and the illumination light having the modulated phase is transmitted through the color filter to display a color image,
wherein the liquid crystal display device is characterized in that a dichroic half mirror is formed between the first and second transparent substrates for each of the color filters, and
wherein the dichroic half mirror comprises plural layers including at least one high-refractive index layer and at least one low-refractive index layer, which are alternately laminated, and at least one of the at least one high-refractive index layer and the low refractive index layer is a layer whose thickness does not vary based on sub-pixel color and a layer whose thickness is adjusted based on associated sub-pixel colors.

2. The liquid crystal display device according to claim 1, wherein
the dichroic half mirror is located between the first transparent substrate and the liquid crystal layer.

3. The liquid crystal display device according to claim 2, wherein
the dichroic half mirror is located between the first transparent substrate and a layer including the transistors.

4. The liquid crystal display device according to claim 3, wherein
the dichroic half mirror functions as a protective layer to prevent an ionic impurity from diffusing from the first transparent substrate to the transistors.

5. The liquid crystal display device according to claim 4, wherein
the dichroic half mirror includes a silicon nitride material and a silicon oxide material.

6. The liquid crystal display device according to claim 1, wherein the dichroic half mirror includes only one layer whose thickness is adjusted based on associated sub-pixel colors which is one of the at least one high-refractive index layer and the at least one low-refractive index layer.

7. The liquid crystal display deice according to claim 6, wherein the only one layer whose thickness is adjusted is disposed in the middle of the layers of the dichroic half mirror.

8. The liquid crystal display device according to claim 6, wherein the dichroic half mirror has five or seven layers.

* * * * *